United States Patent
Lin et al.

(10) Patent No.: US 9,578,865 B1
(45) Date of Patent: Feb. 28, 2017

(54) INSECT ADHESIVE APPARATUS CAPABLE OF AUTOMATICALLY RENEWING INSECT ADHESIVE AREA AND CONTROL METHOD THEREOF

(71) Applicant: INSTITUTE FOR INFORMATION INDUSTRY, Taipei (TW)

(72) Inventors: Chien-Der Lin, Kaohsiung (TW); Yung-Hsing Peng, Kaohsiung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 14/953,295

(22) Filed: Nov. 27, 2015

(30) Foreign Application Priority Data

Oct. 30, 2015 (TW) .............................. 104135752 A (51) Int. Cl.
*A01M 1/14* (2006.01)
*G06F 3/00* (2006.01)

(52) U.S. Cl.
CPC .............. *A01M 1/14* (2013.01); *G06F 3/005* (2013.01)

(58) Field of Classification Search
CPC .......... A01M 1/14; A01M 1/145; A01M 1/16; A01M 1/164; A01M 1/02; A01M 1/026; A01M 1/00; A01M 2200/012
USPC .................................... 43/107, 114, 115, 116
See application file for complete search history.

(56) References Cited

U.S. PATENT DOCUMENTS

| | | | | |
|---|---|---|---|---|
| 3,990,647 A * | 11/1976 | Clifford | ................. | B65H 26/06 242/554 |
| 5,651,211 A * | 7/1997 | Regan | ................... | A01M 1/145 43/113 |
| 6,199,315 B1 * | 3/2001 | Suzue | ..................... | A01M 1/04 43/113 |
| 6,871,443 B2 * | 3/2005 | Lambert | ............... | A01M 1/145 43/113 |
| 7,401,436 B2 * | 7/2008 | Chyun | .................. | A01M 1/145 43/113 |
| 2001/0042337 A1 * | 11/2001 | Lambert | ............... | A01M 1/145 43/113 |
| 2005/0147421 A1 * | 7/2005 | Nakashima | .......... | G03G 15/553 399/23 |

* cited by examiner

*Primary Examiner* — Richard G Davis
(74) *Attorney, Agent, or Firm* — Li & Cai Intellectual Property (USA) Office (57) ABSTRACT

An insect adhesive apparatus capable of automatically renewing an insect adhesive area and a control method thereof. The insect adhesive apparatus includes a roll rack, at least one motor, a camera module and a central control module. The roll rack is configured to equip a roll and unroll the roll to provide a long strip-shaped insect adhesive area. The motor scrolls out the roll on the roll rack according to a first control signal so as to renew the long strip-shaped insect adhesive area. The camera module acquires image information of the insect adhesive area. The central control module analyzes the image information to provide an area occupancy rate of attachments and determine whether the area occupancy rate of attachments is larger than a threshold value. If the area occupancy rate of attachments is larger than the threshold value, the first control signal is output to the motor.

18 Claims, 6 Drawing Sheets

INSECT ADHESIVE APPARATUS CAPABLE OF AUTOMATICALLY RENEWING INSECT ADHESIVE AREA AND CONTROL METHOD THEREOF

BACKGROUND

1. Technical Field

The present invention generally relates to an insect adhesive apparatus for agricultural use and, more particularly, to an insect adhesive apparatus capable of automatically renewing an insect adhesive area and a control method thereof.

2. Description of Related Art

The present insect adhesive apparatus uses disposable insect glue boards, insect glue paper traps or insect glue tapes. When being used, the insect glue boards, insect glue paper traps or insect glue tapes are spread into an insect adhesive area. As a result, the insects flying near the insect adhesive area may get trapped. However, the effective insect adhesive area decreases with the increase of the number of insects being trapped. Accordingly, to maintain the trapping capability, the insect adhesive apparatus has to be updated manually and periodically. Therefore, the present invention provides an insect adhesive apparatus capable of automatically renewing an insect adhesive area and a control method thereof to save manpower.

SUMMARY

The present invention provides an insect adhesive apparatus capable of automatically renewing an insect adhesive area. The insect adhesive apparatus includes a roll rack, at least one motor, a camera module and a central control module. The roll rack is configured to equip a roll and unroll the roll to provide a long strip-shaped insect adhesive area with an insect adhesive glue provided thereon. The motor is configured to scroll out the roll on the roll rack according to a first control signal so as to renew the long strip-shaped insect adhesive area. The camera module is configured to acquire an image information of the long strip-shaped insect adhesive area. The central control module is coupled to the motor and the camera module and is configured to analyze the image information to provide an area occupancy rate of attachments with respect to the image information and determine whether the area occupancy rate of attachments is larger than a first threshold value. The first control signal is output to the at least one motor to drive the at least one motor if the area occupancy rate of attachments is larger than the first threshold value.

Preferably, the central control module is further configured to acquire an insect density distribution during a pre-set time period according to the area occupancy rate of attachments with respect to the image information.

The present invention further provides a control method for an insect adhesive apparatus capable of automatically renewing an insect adhesive area. The insect adhesive apparatus includes a roll rack, at least one motor, a camera module and a central control module. The configured to equip a roll and unroll the roll to provide a long strip-shaped insect adhesive area with an insect adhesive glue provided thereon. The motor is configured to scroll out the roll on the roll rack according to a first control signal so as to renew the long strip-shaped insect adhesive area. The control method includes the steps herein. The camera module acquires an image information of the long strip-shaped insect adhesive area. The central control module analyzes the image information to provide an area occupancy rate of attachments with respect to the image information and determine whether the area occupancy rate of attachments is larger than a first threshold value. The first control signal is output to the at least one motor to drive the at least one motor if the area occupancy rate of attachments is larger than the first threshold value Preferably, the central control module is further configured to acquire an insect density distribution during a pre-set time period according to the area occupancy rate of attachments with respect to the image information.

As previously stated, the insect adhesive apparatus capable of automatically renewing an insect adhesive area and the control method thereof according to the present invention overcome the problems of renewing the insect adhesive area manually so as to effectively maintain the trapping capability. In addition, the insect adhesive apparatus and the control method thereof are capable of acquiring an insect density distribution according to the image information acquired by the camera module so as to effectively improve agricultural prevention and cure.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure.

Figure 1:
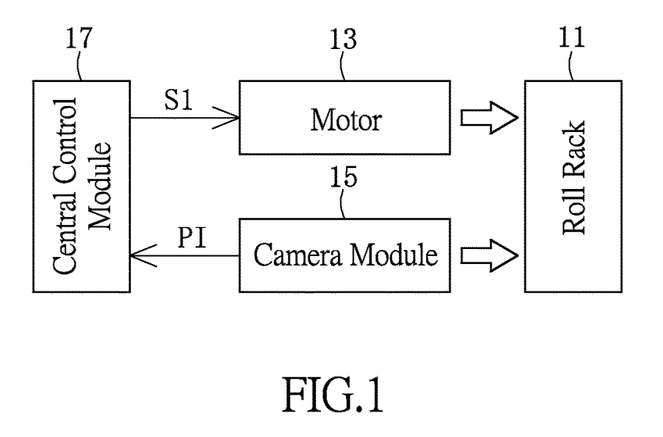
FIG. 1 is a schematic diagram of an insect adhesive apparatus capable of automatically renewing an insect adhesive area according to one embodiment of the present invention.

Referring to FIG. 1, FIG. 1 is a schematic diagram of an insect adhesive apparatus capable of automatically renewing an insect adhesive area according to one embodiment of the present invention. The insect adhesive apparatus 1 includes a roll rack 11, at least one motor 13, a camera module 15 and a central control module 17. It should be noted that the roll rack 11, the motor 13, the camera module 15 and the central control module 17 may be integratedly or separately disposed, to which the present invention is not limited. In brief, the present invention is not limited to the previous examples of the insect adhesive apparatus 1.

Furthermore, the roll rack 11 is configured to equip a roll and unroll the roll to provide a long strip-shaped insect adhesive area with an insect adhesive glue provided thereon. It should be noted that, since the present invention is not limited to any examples of the roll rack 11, the person with ordinary skill in the art may make any modifications according to practical demand. Therefore, detailed descriptions of the roll rack 11 are not presented herein. However, to make the present invention more easily understood, the roll installed on the roll rack 11 is exemplified by an insect glue roll, to which the present invention is not limited.

Figure 2:
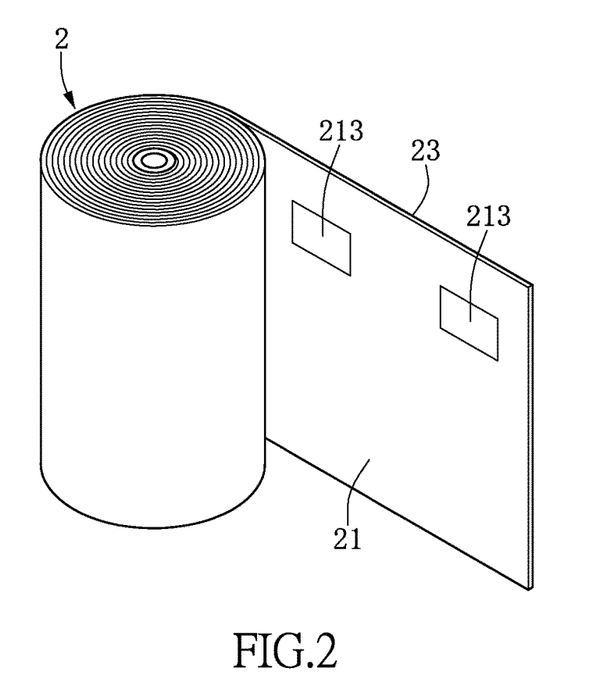
FIG. 2 is a perspective view of a roll according to one embodiment of the present invention.
Figure 3:
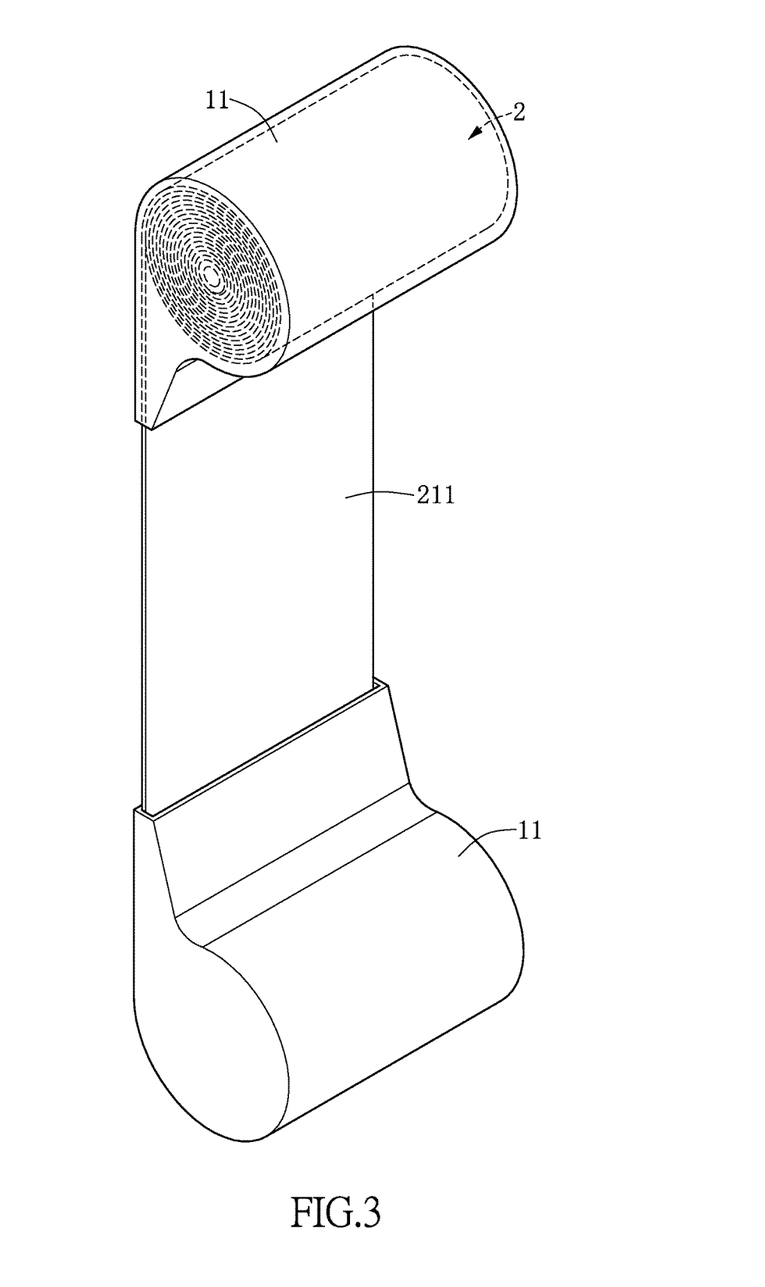
FIG. 3 is a schematic diagram of the roll in FIG. 2 installed on a roll rack of the insect adhesive apparatus in FIG. 1.

Referring to both FIG. 2 and FIG. 3, FIG. 2 is a perspective view of a roll according to one embodiment of the present invention and FIG. 3 is a schematic diagram of the roll in FIG. 2 installed on a roll rack of the insect adhesive apparatus in FIG. 1. The roll 2 has two opposite surfaces 21 and 21, one of which (for example, the surface 21) is coated with an insect adhesive glue provided thereon. Therefore, when the roll 2 is installed on the roll rack 11, the roll 2 may be unrolled to provide a long strip-shaped insect adhesive area 211 so that the insects flying near the insect adhesive area 211 may get trapped, as shown in FIG. 3.

Furthermore, the motor 13 is configured to scroll out the roll 2 on the roll rack 11 according to a first control signal S1 so as to renew the long strip-shaped insect adhesive area 211. The camera module 15 is configured to acquire an image information PI of the long strip-shaped insect adhesive area 211. It should be noted that, in a certain embodiment, the camera module 15 may periodically acquire the image information PI, for example, once every 24 hours or once every three days. However, the present invention is not limited thereto. The central control module 17 is coupled to the motor 13 and the camera module 15. The central control module 17 is configured to analyze the image information PI to provide an area occupancy rate of attachments with respect to the image information PI and to determine whether the area occupancy rate of attachments is larger than a first threshold value. If the area occupancy rate of attachments is larger than the first threshold value, the first control signal S1 is output to the motor 13 to drive the motor 13 to rotate.

Accordingly, one object of the insect adhesive apparatus 1 of the present invention is to acquire the image information PI of the insect adhesive area 211 using the internal camera module 15 and to analyze, by the central control module 17, the image information to provide an area occupancy rate of attachments with respect to the image information PI so that the central control module 17 determines whether or not to drive the motor 13 to renew the insect adhesive area 211.

It should be noted that, since the insect adhesive area 211 may also trap non-insect objects (for example, twigs, leaves and dust), the effective insect adhesive area 211 may also decrease. Therefore, as previously stated, the person with ordinary skill in the art should understand that the area occupancy rate of attachments refers to the rate of the insect adhesive area 211 being occupied. In other words, the remaining area of the insect adhesive area 211 decreases when the area occupancy rate of attachments increases. Therefore, to maintain the trapping capability, when the area occupancy rate of attachments is larger than a certain threshold value (for example, the first threshold value), the central control module 17 outputs the first control signal S1 to drive the motor 13 to rotate to renew the insect adhesive area 211.

Practically, the first threshold value is a variable depending on the practical demand. Moreover, the camera module 15 can be implemented by a charge-coupled device (CCD) to acquire the image information PI of the insect adhesive area 211. The central control module 17 may use Otsu binarization algorithm to process the image information PI and calculate the area occupancy rate of attachments with respect to the image information PI, and determine whether the area occupancy rate of attachments is larger than the first threshold value. However, since the CCD and the Otsu binarization algorithm are known to the person with ordinary skill in the art, detailed descriptions thereof are not presented herein. It should be noted that the previous examples are only exemplary and are not intended to limit the present invention.

On the other hand, the camera module 15 and the central control module 17 may further incorporate intelligent image analysis to classify and analyze the attachments on the insect adhesive area 211 to precisely calculate the occupied area of the insect adhesive area 211 by insects. As a result, the area occupancy rate of attachments provided by the central control module 17 can be regarded as the density of trapped insects by the insect adhesive area 211. In other words, the object of the insect adhesive apparatus 1 can be focused on that the roll 2 is scrolled out, via the rotation of the motor 13 controlled by the central control module 17, to renew the insect adhesive area 211 automatically without manpower when the insect adhesive area 211 is determined to have trapped insects with a certain threshold density.

As previously stated, in some embodiments, the camera module 15 is configured to periodically acquire the image information PI and the central control module 17 is further configured to analyze and record the area occupancy rate of attachments according to the periodically acquired image information to further calculate an insect density distribution within a pre-set time period. With the development in big data, one object of the insect adhesive apparatus 1 of the present invention is to use the insect density distribution in the follow-up installation of infrastructure to so as to effectively improve agricultural prevention and cure.

Figure 4:
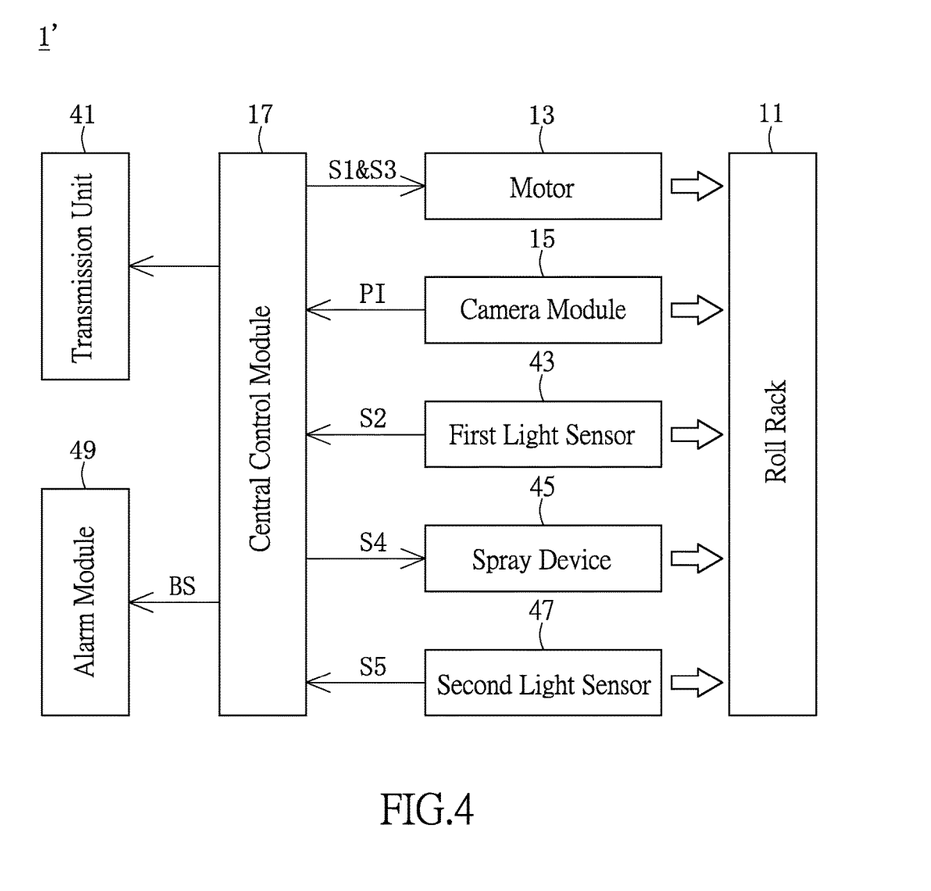
FIG. 4 is a schematic diagram of an insect adhesive apparatus capable of automatically renewing an insect adhesive area according to another embodiment of the present invention.

Practically, the area occupancy rate of attachments or the insect density distribution can be recorded and stored in a memory (not shown) in the central control module 17 or transmitted through a transmission unit to a cloud server (not shown), to which the present invention is not limited. Referring to FIG. 4, FIG. 4 is a schematic diagram of an insect adhesive apparatus capable of automatically renewing an insect adhesive area according to another embodiment of the present invention. Some elements in FIG. 4 are labeled in the same way as those in FIG. 1, and descriptions thereof are not repeated herein. Compared to the insect adhesive apparatus 1 in FIG. 1, the insect adhesive apparatus 1' in FIG. 4 further includes a transmission unit 41. The transmission unit 41 is configured to transmit the area occupancy rate of attachments or the insect density distribution during the pre-set time period wiredly or wirelessly to a cloud server. It should be noted that the present invention is not limited to the previous examples of the transmission unit 41. The person with ordinary skill in the art may make any modifications according to practical demand.

However, as previously stated, since the motor 13 is controlled by first control signal S1 output from the central control module 17 to scroll out the roll 2 to renew the insect adhesive area 211. Therefore, it is crucial to control the central control module 17 to stop driving the motor 13 so that the insect adhesive apparatus 1' according to the present invention can be automatically controlled. Referring again to FIG. 2 to FIG. 4, the roll 2 is provided with a plurality of light sensing regions 213 thereon. A spacing is provided between every two adjacent ones of the plurality of light sensing regions 213. Accordingly, the insect adhesive apparatus 1' in FIG. 4 includes a first light sensor 43. The first light sensor 43 is coupled to the central control module 17 and is configured to sense the plurality of light sensing regions 213 on the roll 2 when the motor 13 scrolls out the roll 2. The first light sensor 43 outputs a second control signal S2 to the central control module 17 when the first light sensor 43 senses one of the plurality of light sensing regions 213 on the roll 2 so that the central control module 17 outputs a third control signal S3 to stop the motor 13.

As previously stated, the person with ordinary skill in the art should understand the spacing provided between every two adjacent ones of the plurality of light sensing regions 213 is the length of the long side of the long strip-shaped insect adhesive area 211. Accordingly, when the first light sensor 43 senses one of the light sensing regions 213 on the roll 2, the insect adhesive area 211 on the roll 2 has been renewed. Therefore, the first light sensor 43 outputs the second control signal S2 to the central control module 17 and further drives the central control module 17 to output the third control signal S3 to stop the rotation of the motor 13. It should be noted that the previous description is only exemplary and is not intended to limit the present invention.

On the other hand, the central control module 17 may also output the third control signal S3 to stop the rotation of the motor 13 after the first control signal S1 has been output for a first pre-set time period. However, the present invention is not limited to how the central control module 17 stops the rotation of the motor 13.

In addition, as previously stated, the present invention is not limited to the previous examples of the roll 2 on the roll rack 11. In other words, the roll 2 may also be implemented by a paper roll 2. Therefore, the surface 21 (or the surface 23) of the roll 2 does not have to be provided with the insect adhesive glue thereon so as to reduce the resistance to the rotation of the motor 13 with more convenience. Accordingly, the insect adhesive apparatus 1' in FIG. 4 may further include a spray device 45. The spray device 45 is coupled to the central control module 17 and is configured to spray on the long strip-shaped insect adhesive area 211 so that the long strip-shaped insect adhesive area 211 is provided with the insect adhesive glue thereon. It should be noted that, the spray device 45 may include a container containing an insect adhesive glue and a spray nozzle, to which the present invention is not limited. In brief, the present invention is not limited to the previous example of the spray device 45.

Furthermore, the spray device 45 may spray on the long strip-shaped insect adhesive area 211 according to a fourth control signal S4. The fourth control signal is generated by the central control module 17 after a second pre-set time period. It should be noted that the present invention is not limited to how the insect adhesive area 211 is provided with the insect adhesive glue. The person with ordinary skill in the art may make any modifications according to practical demand.

Referring to FIG. 4, the insect adhesive apparatus 1' of the present invention may further include a second light sensor 47 and an alarm module 49. The second light sensor 47 is coupled to the central control module 17 and is configured to detect a radius thickness of the roll 2 according to a distance between the roll 2 and the second light sensor 47 and output a fifth control signal S5 to the central control module 17 when the radius thickness is smaller than a second threshold value. Moreover, the alarm module 49 is also coupled to the central control module 17 and is configured to generate an alarm message according to an alarm signal BS. The alarm signal BS is generated by the central control module 17 after receiving the fifth control signal S5.

Figure 5:
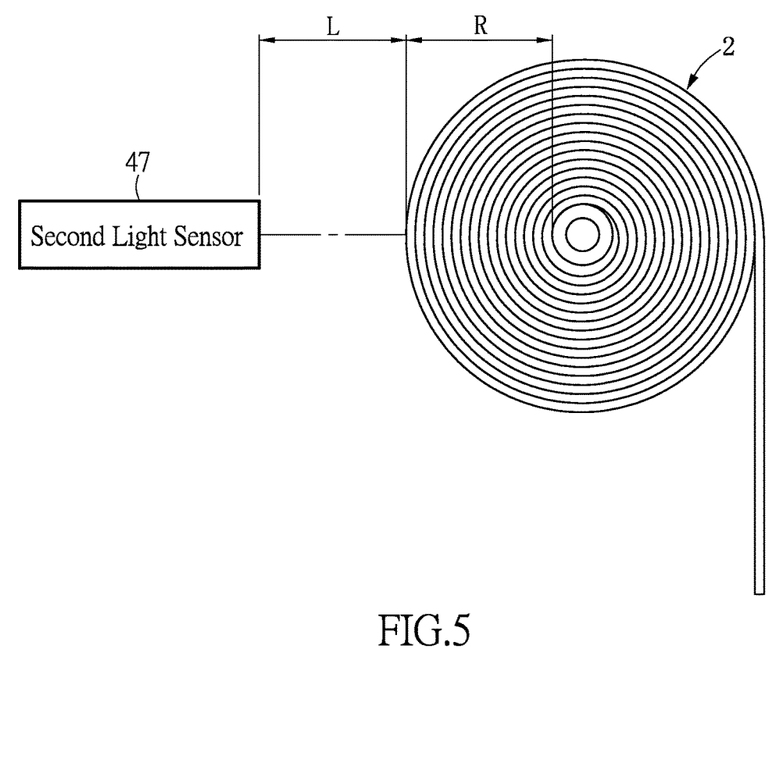
FIG. 5 is a schematic diagram of a second light sensor of the insect adhesive apparatus in FIG. 4 detecting a radius thickness of a roll.

Referring to FIG. 5, FIG. 5 is a schematic diagram of a second light sensor of the insect adhesive apparatus in FIG. 4 detecting a radius thickness of a roll. More particularly, the second light sensor 47 is configured to emit light onto the roll 2 and received light reflected from the roll 2. Thereby, the second light sensor 47 acquires the distance L between the second light sensor 47 and the roll 2 by calculating a time interval between emitting and receiving the light to further detect the radius thickness R of the roll 2.

Conventionally, the person with ordinary skill in the art should understand that the radius thickness R of the roll 2 decreases as the roll 2 is scrolled out to renew the insect adhesive area 211. Therefore, when the radius thickness R decreases to a threshold value (for example, the second threshold value), the second light sensor 47 determines to renew the roll 2 and output a fifth control signal S5 to the central control module 17. Moreover, the central control module 17 outputs the alarm signal BS to the alarm module 49, so that the alarm module 49 outputs the alarm message to inform the user to replace the roll 2. Practically, the alarm module 49 may be a buzzer or a warning lamp to generate a sound, a strobe or the like as the alarm message. The present invention is not limited to the previous examples of the alarm module 49 and the alarm message. The person with ordinary skill in the art may make any modifications according to practical demand.

Figure 6:
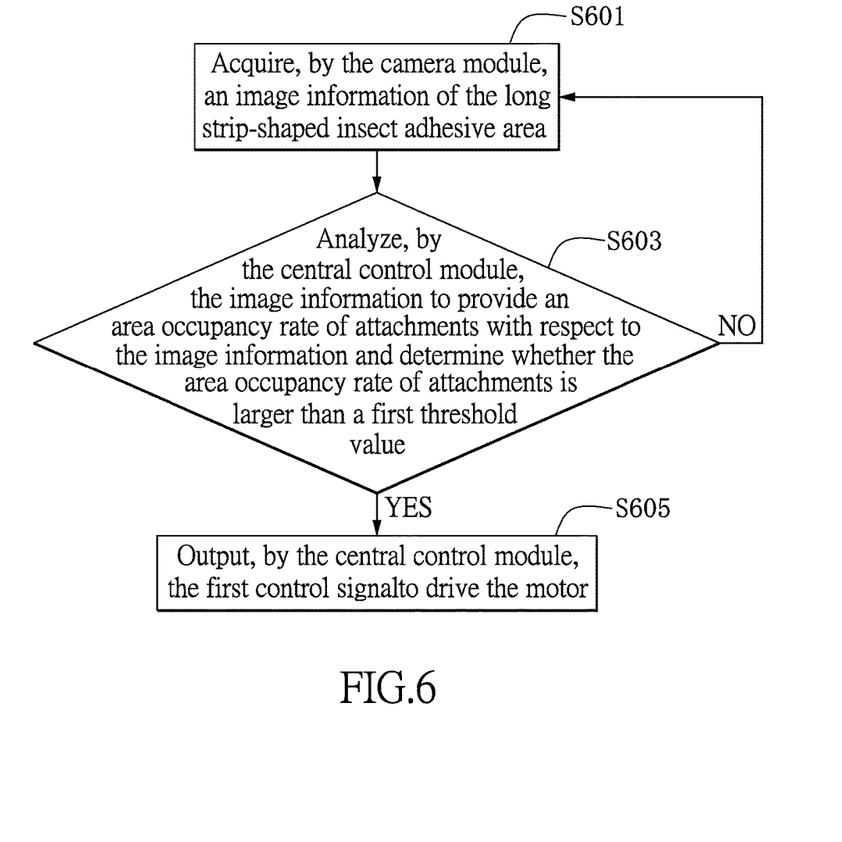
FIG. 6 is a flowchart of a control method for an insect adhesive apparatus capable of automatically renewing an insect adhesive area according to one embodiment of the present invention.

To further describe the control method for an insect adhesive apparatus capable of automatically renewing an insect adhesive area, the present invention provides an embodiment as an example as described herein. Referring to FIG. 6, FIG. 6 is a flowchart of a control method for an insect adhesive apparatus capable of automatically renewing an insect adhesive area according to one embodiment of the present invention. Since the control method may be performed with the insect adhesive apparatus 1 in FIG. 1, please refer to FIG. 1, FIG. 2 and FIG. 3. Furthermore, some elements have been described with the previous embodiments and are not repeated herein.

In Step S601, the camera module acquires an image information of the long strip-shaped insect adhesive area. Then, in Step S603, the central control module analyzes the image information to provide an area occupancy rate of attachments with respect to the image information and determines whether the area occupancy rate of attachments is larger than a first threshold value. Next, in Step S605, if the area occupancy rate of attachments is larger than the first threshold value, the central control module outputs the first control signal to the motor to drive the motor to renew the insect adhesive area. Otherwise, if the area occupancy rate of attachments is not larger than the first threshold value, the method returns to Step S601.

Figure 7:
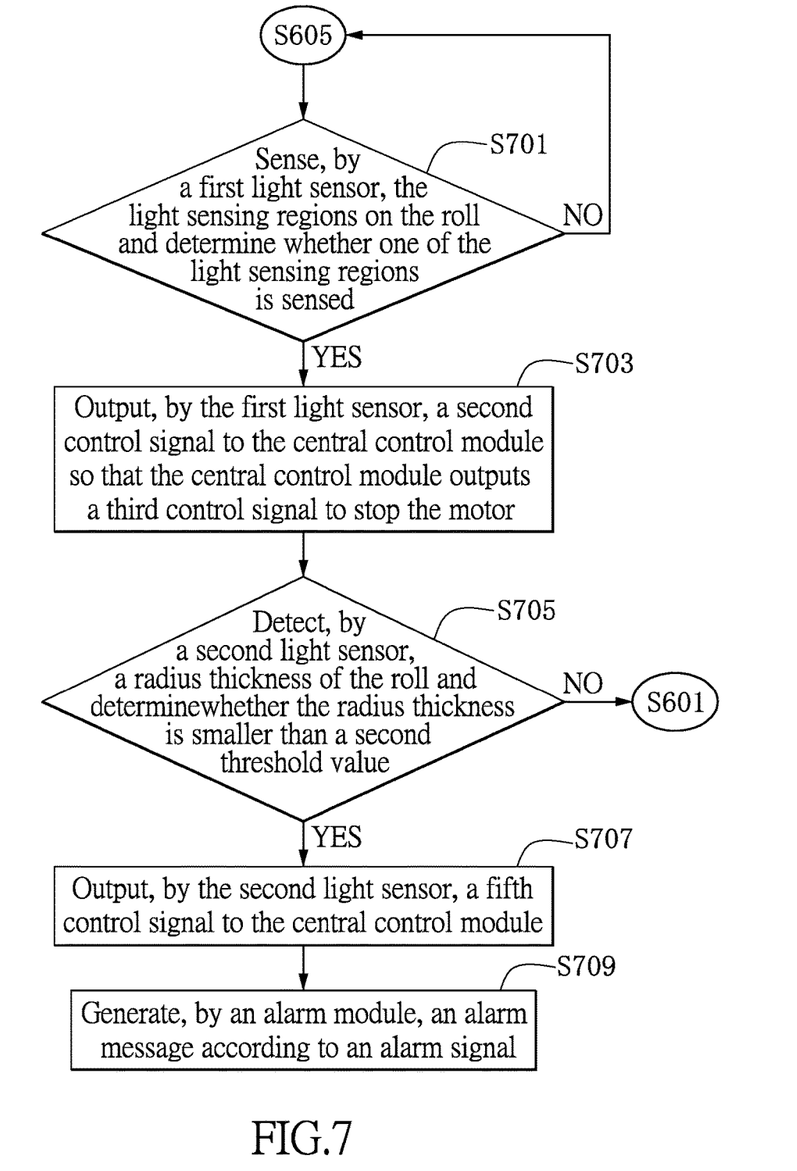
FIG. 7 is a flowchart of a control method for an insect adhesive apparatus capable of automatically renewing an insect adhesive area according to another embodiment of the present invention.

On the other hand, to further describe the operation of the insect adhesive apparatus 1', the present invention provides another embodiment as an example as described herein. Referring to FIG. 7, FIG. 7 is a flowchart of a control method for an insect adhesive apparatus capable of automatically renewing an insect adhesive area according to another embodiment of the present invention. Since the control method may be performed with the insect adhesive apparatus 1' in FIG. 4, please refer to FIG. 2 to FIG. 5. Some steps in FIG. 7 are labeled in the same way as those in FIG. 6, and descriptions thereof are not repeated herein. Furthermore, detailed descriptions of some steps have been described with the previous embodiment and are not repeated herein.

After Step S605, in Step S701, a first light sensor is used to sense the light sensing regions on the roll and determine whether one of the light sensing regions is sensed. Then, in Step S703, if one of the light sensing regions on the roll is sensed, the first light sensor outputs a second control signal to the central control module so that the central control module outputs a third control signal to stop the motor. Otherwise, if none of the light sensing regions on the roll is sensed, the method repeats Step S605 to Step S701. Therefore, as previously stated, the person with ordinary skill in the art should understand that Step S605 and Step S701 can be performed in parallel without conflict.

Then, in Step S705, a second light sensor is used to detect a radius thickness of the roll according to a distance between the roll and the second light sensor and to determine whether the radius thickness is smaller than a second threshold value. In Step S707, if the thickness is smaller than the second threshold value, the second light sensor outputs a fifth control signal to the central control module. Moreover, in Step S709, an alarm module generates an alarm message according to an alarm signal. The alarm signal is generated by the central control module after receiving the fifth control signal. Otherwise, if the radius thickness is not smaller than the second threshold value, the method returns to Step S601.

On the other hand, as previously stated, since the area occupancy rate of attachments or the insect density distribution may be recorded or stored in the cloud server, a transmission unit may be used to transmit the area occupancy rate of attachments or the insect density distribution during the pre-set time period wiredly or wirelessly to a cloud server during Step S601 to Step S709.

Moreover, as previously stated, the roll may also be a paper roll instead of an insect glue roll. Therefore, during Step S601 to Step S709, the method of the present invention may further use a spray device to spray on the long strip-shaped insect adhesive area so that the long strip-shaped insect adhesive area is provided with the insect adhesive glue thereon. The spray device may spray on the long strip-shaped insect adhesive area according to a fourth control signal S4. The fourth control signal is generated by the central control module 17 after a second pre-set time period.

As previously stated, the insect adhesive apparatus capable of automatically renewing an insect adhesive area and the control method thereof according to the present invention overcome the problems of renewing the insect adhesive area manually so as to effectively maintain the trapping capability. In addition, the insect adhesive apparatus and the control method thereof are capable of acquiring an insect density distribution according to the image information acquired by the camera module so as to effectively improve agricultural prevention and cure.

The above-mentioned descriptions represent merely the exemplary embodiments of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An insect adhesive apparatus capable of automatically renewing an insect adhesive area, comprising:
   a roll rack configured to equip a roll and unroll said roll to provide a long strip-shaped insect adhesive area with an insect adhesive glue provided thereon;
   at least one motor configured to scroll out said roll on said roll rack according to a first control signal so as to renew said long strip-shaped insect adhesive area;
   a camera module configured to acquire an image information of said long strip-shaped insect adhesive area;
   a central control module coupled to said at least one motor and said camera module and configured to analyze said image information to provide an area occupancy rate of attachments with respect to said image information and determine whether said area occupancy rate of attachments is larger than a first threshold value, wherein said first control signal is output to said at least one motor to drive said at least one motor if said area occupancy rate of attachments is larger than said first threshold value; and
   a spray device coupled to said central control module and configured to spray on said long strip-shaped insect adhesive area so that said long strip-shaped insect adhesive area is provided with said insect adhesive glue thereon.

2. The insect adhesive apparatus of claim 1, wherein said central control module is further configured to acquire an insect density distribution during a pre-set time period according to said area occupancy rate of attachments with respect to said image information.

3. The insect adhesive apparatus of claim 2, further comprising:
   a transmission unit configured to transmit said area occupancy rate of attachments or said insect density distribution during said pre-set time period wiredly or wirelessly to a cloud server.

4. The insect adhesive apparatus of claim 1, wherein a plurality of light sensing regions are provided on said roll and a spacing is provided between two adjacent ones of said plurality of light sensing regions.

5. The insect adhesive apparatus of claim 4, further comprising:
   a first light sensor coupled to said central control module and configured to sense said plurality of light sensing regions on said roll when said at least one motor scrolls out said roll and output a second control signal to said central control module when said first light sensor senses one of said plurality of light sensing regions on said roll so that said central control module outputs a third control signal to stop said at least one motor.

6. The insect adhesive apparatus of claim 1, wherein said central control module is further configured to output a third control signal to stop said at least one motor after said first control signal has been output for a first pre-set time period.

7. The insect adhesive apparatus of claim 1, wherein said spray device is configured to spray on said long strip-shaped insect adhesive area according to a fourth control signal, wherein said fourth control signal is generated by said central control module after a second pre-set time period.

8. The insect adhesive apparatus of claim 1, further comprising:
a second light sensor coupled to said central control module and configured to detect a radius thickness of said roll according to a distance between said roll and said second light sensor and output a fifth control signal to said central control module when said radius thickness is smaller than a second threshold value.

9. The insect adhesive apparatus of claim 8, further comprising:
an alarm module coupled to said central control module and configured to generate an alarm message according to an alarm signal, wherein said alarm signal is generated by said central control module after receiving said fifth control signal.

10. A control method for an insect adhesive apparatus capable of automatically renewing an insect adhesive area, said insect adhesive apparatus comprising a roll rack, at least one motor, a camera module and a central control module, said roll rack being configured to equip a roll and unroll said roll to provide a long strip-shaped insect adhesive area with an insect adhesive glue provided thereon, said at least one motor configured to scroll out said roll on said roll rack according to a first control signal so as to renew said long strip-shaped insect adhesive area, said control method comprising:
acquiring, by said camera module, an image information of said long strip-shaped insect adhesive area;
analyzing, by said central control module, said image information to provide an area occupancy rate of attachments with respect to said image information and determine whether said area occupancy rate of attachments is larger than a first threshold value, wherein said first control signal is output to said at least one motor to drive said at least one motor if said area occupancy rate of attachments is larger than said first threshold value; and
spraying, by a spray device, on said long strip-shaped insect adhesive area so that said long strip-shaped insect adhesive area is provided with said insect adhesive glue thereon.

11. The control method of claim 10, wherein said central control module is further configured to acquire an insect density distribution during a pre-set time period according to said area occupancy rate of attachments with respect to said image information.

12. The control method of claim 11, further comprising:
transmitting, by a transmission unit, said area occupancy rate of attachments or said insect density distribution during said pre-set time period wiredly or wirelessly to a cloud server.

13. The control method of claim 10, wherein a plurality of light sensing regions are provided on said roll and a spacing is provided between two adjacent ones of said plurality of light sensing regions.

14. The control method of claim 13, further comprising:
sensing, by a first light sensor, said plurality of light sensing regions on said roll when said at least one motor scrolls out said roll and outputting a second control signal to said central control module when said first light sensor senses one of said plurality of light sensing regions on said roll so that said central control module outputs a third control signal to stop said at least one motor.

15. The control method of claim 10, wherein said central control module is further configured to output a third control signal to stop said at least one motor after said first control signal has been output for a first pre-set time period.

16. The control method of claim 10, wherein said spray device is configured to spray on said long strip-shaped insect adhesive area according to a fourth control signal, wherein said fourth control signal is generated by said central control module after a second pre-set time period.

17. The control method of claim 10, further comprising:
detecting, by a second light sensor, a radius thickness of said roll according to a distance between said roll and said second light sensor and outputting a fifth control signal to said central control module when said radius thickness is smaller than a second threshold value.

18. The control method of claim 17, further comprising:
generating, by an alarm module, an alarm message according to an alarm signal, wherein said alarm signal is generated by said central control module after receiving said fifth control signal.

* * * * *